US011954864B2

(12) United States Patent
Wang et al.

(10) Patent No.: US 11,954,864 B2
(45) Date of Patent: Apr. 9, 2024

(54) MEDICAL IMAGE SEGMENTATION METHOD, IMAGE SEGMENTATION METHOD, AND RELATED APPARATUS AND SYSTEM

(71) Applicant: TENCENT TECHNOLOGY (SHENZHEN) COMPANY LIMITED, Shenzhen (CN)

(72) Inventors: Liang Wang, Shenzhen (CN); Jun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 531 days.

(21) Appl. No.: 17/239,532

(22) Filed: Apr. 23, 2021

(65) Prior Publication Data

US 2021/0264613 A1 Aug. 26, 2021

Related U.S. Application Data

(63) Continuation of application No. PCT/CN2020/074712, filed on Feb. 11, 2020.

(30) Foreign Application Priority Data

Feb. 15, 2019 (CN) .......................... 201910116353.0

(51) Int. Cl.
*G06T 7/149* (2017.01)
*G06T 7/11* (2017.01)

(52) U.S. Cl.
CPC ................ *G06T 7/149* (2017.01); *G06T 7/11* (2017.01); *G06T 2207/10028* (2013.01); *G06T 2207/20081* (2013.01); *G06T 2207/30004* (2013.01)

(58) Field of Classification Search
CPC . G06T 7/149; G06T 7/11; G06T 2207/10028; G06T 2207/20081;
(Continued)

(56) References Cited

U.S. PATENT DOCUMENTS

2018/0140216 A1 5/2018 Li et al.
2018/0350080 A1 12/2018 Kao et al.
(Continued)

FOREIGN PATENT DOCUMENTS

CN 101334895 A 12/2008
CN 101334895 B 9/2011
(Continued)

OTHER PUBLICATIONS

Ren, Malik. Learning a classification model for segmentation. InProceedings ninth IEEE international conference on computer vision Oct. 13, 2003 (pp. 10-17). IEEE. (Year: 2003).*
(Continued)

*Primary Examiner* — Fayyaz Alam
(74) *Attorney, Agent, or Firm* — ANOVA LAW GROUP, PLLC

(57) ABSTRACT

The present disclosure provides a medical image segmentation method. The medical image segmentation method includes acquiring a to-be-processed medical image set, the to-be-processed medical image set including a plurality of to-be-processed medical images corresponding to different time points, processing the to-be-processed medical image set in a time dimension according to the to-be-processed medical images and the time points corresponding to the to-be-processed medical images to obtain a temporal dynamic image, and extracting a target region feature from the temporal dynamic image by using a medical image segmentation model, to acquire a target region.

20 Claims, 12 Drawing Sheets

(58) Field of Classification Search
CPC . G06T 2207/30004; G06T 2207/10096; G06T 2207/10116; G06T 2207/30068; G06T 2207/30096; G06T 7/0012; G06T 2207/10088; G06V 10/26; G06V 10/774; G06V 20/64; G06V 20/49; G06V 20/695; G06V 2201/03; G06F 18/214
See application file for complete search history.

(56) References Cited

U.S. PATENT DOCUMENTS

| | | | |
|---|---|---|---|
| 2019/0139223 | A1 | 5/2019 | Nie et al. |
| 2020/0320688 | A1 | 10/2020 | Tu et al. |
| 2020/0380675 | A1* | 12/2020 | Golden .................. G06T 7/143 |
| 2021/0248736 | A1* | 8/2021 | Kamen ................. G06F 18/214 |

FOREIGN PATENT DOCUMENTS

| | | |
|---|---|---|
| CN | 104143035 A | 11/2014 |
| CN | 106056610 A | 10/2016 |
| CN | 106600621 A | 4/2017 |
| CN | 107563378 A | 1/2018 |
| CN | 107808377 A | 3/2018 |
| CN | 108038848 A | 5/2018 |
| CN | 108509830 A | 9/2018 |
| CN | 109872312 A | 6/2019 |
| TW | 201832181 A | 9/2018 |
| TW | 201903708 A | 1/2019 |
| WO | 2017134482 A1 | 8/2017 |
| WO | 2018152157 A1 | 8/2018 |

OTHER PUBLICATIONS

Fan J, Yau DK, Elmagarmid AK, Aref WG. Automatic image segmentation by integrating color-edge extraction and seeded region growing. IEEE transactions on image processing. Oct. 2001; 10(10):1454-66. (Year: 2001).*

Al-Kofahi Y, Lassoued W, Lee W, Roysam B. Improved automatic detection and segmentation of cell nuclei in histopathology images. IEEE Transactions on Biomedical Engineering. Oct. 30, 2009;57(4):841-52. (Year: 2009).*

The European Patent Office (EPO) The Extended European Search Report for 20755319.9 dated Mar. 7, 2022 8 Pages (including translation).

Frank G. Zollner et al., "Assessment of 3D DCE-MRI of the kidneys using non-rigid image registration and segmentation of voxel time courses," Computerized Medical Imaging and Graphics, Pergamon Press, New York, NY, US, vol. 33, No. 3, Apr. 2009 (Apr. 2009), pp. 171-181. 11 pages.

Jun Zhang et al., "Automatic deep learning-based normalization of breast dynamic contrast-enhanced magnetic resonance images," arxiv.org, arXiv:1807.02152v1, Jul. 5, 2018 (Jul. 5, 2018). 11 pages.

Taiwan Intellectual Property Office Examination report for Application No. 11020404340 dated Apr. 30, 2021 6 pages (including translation).

The World Intellectual Property Organization (WIPO) International Search Report for PCT/CN2020/074712 dated Apr. 20, 2020 5 Pages (including translation).

The State Intellectual Property Office of the People's Republic of China (SIPO) Office Action 1 for for 201910741376.0 dated Aug. 27, 2020 12 Pages (including translation).

The State Intellectual Property Office of the People's Republic of China (SIPO) Office Action 3 for for 201910741376.0 dated Jan. 20, 2021 11 Pages (including translation).

Xiao-Xia Yin et al., "Pattern Classification of Medical Images: Computer Aided Diagnosis," Health Information Science, pp. 131-177, Dec. 31, 2017. 51 pages.

Anna Vignati et al., "Performance of a Fully Automatic Lesion Detection System for Breast DCE-MRI," Journal of Magnetic Resonance Imaging vol. 34, pp. 1341-1351, Dec. 31, 2011. 11 pages.

* cited by examiner

MEDICAL IMAGE SEGMENTATION METHOD, IMAGE SEGMENTATION METHOD, AND RELATED APPARATUS AND SYSTEM

RELATED APPLICATION

This application is a continuation application of PCT Patent Application No. PCT/CN2020/074712, filed on Feb. 11, 2020, which claims priority to Chinese Patent Application No. 201910116353.0, filed with the National Intellectual Property Administration, PRC on Feb. 15, 2019 and entitled "MEDICAL IMAGE SEGMENTATION METHOD, APPARATUS, AND SYSTEM, AND IMAGE SEGMENTATION METHOD", all of which are incorporated herein by reference in entirety.

FIELD OF THE TECHNOLOGY

The present disclosure relates to the field of computer technologies, and more particularly, to an image segmentation technology.

BACKGROUND

Image segmentation is a technology and process of segmenting an image into several particular regions having special properties, and then identifying a target of interest. With the development of computer technologies and medical analysis technologies, medical image segmentation becomes the top priority of the medical analysis technologies and is the key to deciding whether a medical image can provide a reliable basis in clinical diagnosis and treatment. The development of the medical image segmentation technology not only affects the development of other related technologies in medical image processing, for example, visualization and three-dimensional reconstruction, but also is instrumental in biomedical image analysis.

Because a lesion region and a non-lesion region undergo different changes over time under the effect of medical reagents, in the related art, a deep learning network model is trained by using medical images at all time points, and then the lesion region on the medical image is segmented by using the deep learning network model.

However, although segmenting the lesion region by using the deep learning network model may achieve certain accuracy, such segmentation often requires labeling the medical image at each time point of training the model, and the workload of the labeling is often unbearably heavy, which in turn increases the complexity of the model training.

SUMMARY

Embodiments of the present disclosure provide a medical image segmentation method, an image segmentation method, and a related apparatus, to at least reduce the workload of labeling to some extent, so that the training of a medical image segmentation model is more convenient improving the diagnosis efficiency of doctors.

Other features and advantages of the present disclosure become obvious through the following detailed descriptions, or may be partially learned through the practice of the present disclosure.

According to an aspect of the embodiments of the present disclosure, a medical image segmentation method is provided, including: acquiring a to-be-processed medical image set, the to-be-processed medical image set including a plurality of to-be-processed medical images corresponding to different time points; processing the to-be-processed medical image set in a time dimension according to the to-be-processed medical images and the time points corresponding to the to-be-processed medical images to obtain a temporal dynamic image; and extracting a target region feature from the temporal dynamic image by using a medical image segmentation model, to acquire a target region.

According to another aspect of the embodiments of the present disclosure, a medical image segmentation apparatus is provided, including: an acquisition module, configured to acquire a to-be-processed medical image set, the to-be-processed medical image set including a plurality of to-be-processed medical images corresponding to different time points; a processing module, configured to process the to-be-processed medical image set in a time dimension according to the to-be-processed medical images and the time points corresponding to the to-be-processed medical images to obtain a temporal dynamic image; and a segmentation module, configured to extract a target region feature from the temporal dynamic image by using a medical image segmentation model, to acquire a target region.

In some embodiments of the present disclosure, when or in response to determining a plurality of the to-be-processed medical image sets are acquired, each of the to-be-processed medical image sets corresponds to a cross section, and the to-be-processed medical images corresponding to the same time point in the to-be-processed medical image sets form a three-dimensional (3D) medical image. Based on the foregoing solutions, the medical image segmentation apparatus includes: a cross section determining module, configured to determine a coordinate plane corresponding to the cross section and a cross section coordinate axis according to three dimensions of the 3D medical image, the cross section coordinate axis being perpendicular to the coordinate plane.

In some embodiments of the present disclosure, based on the foregoing solutions, the processing module includes: a four-dimensional (4D) data acquisition unit, configured to determine 4D data corresponding to the cross section according to to-be-processed medical image data corresponding to the cross section and the time point; a first time component acquisition unit, configured to analyze the 4D data corresponding to each of the cross sections to obtain a time component corresponding to each of the cross sections; a second time component acquisition unit, configured to determine a target time component corresponding to the plurality of the to-be-processed medical image sets according to the time component corresponding to each of the cross sections; and a post-processing unit, configured to perform post-processing on the target time component to obtain the temporal dynamic image.

In some embodiments of the present disclosure, based on the foregoing solutions, the 4D data acquisition unit includes: a spatial coordinate determining unit, configured to determine a first coordinate, a second coordinate, and a cross section coordinate according to 3D medical image data corresponding to the cross section, the first coordinate, the second coordinate, and the cross section coordinate being perpendicular to each other; a time coordinate determining unit, configured to determine a time coordinate according to the time point; and a 4D data determining unit, configured to construct 4D coordinate axes according to the first coordinate, the second coordinate, the cross section coordinate, and the time coordinate, and determine the 4D data according to the 4D coordinate axes.

In some embodiments of the present disclosure, based on the foregoing solutions, the first time component acquisition unit includes: a first image data acquisition unit, configured to determine a target cross section according to the cross section coordinate, and acquire first image data corresponding to the target cross section, the first image data including the first coordinate, the second coordinate, and the time coordinate; and a multi-dimensional analyzing unit, configured to perform a multi-dimensional analysis on the first image data to acquire a time component corresponding to the target cross section; repeating the foregoing operations until the time component corresponding to the cross sections are acquired.

In some embodiments of the present disclosure, based on the foregoing solutions, the second time component acquisition unit is configured to: determine the target time component according to the time component corresponding to each of the cross sections, and a first coordinate, a second coordinate, and a cross section coordinate that correspond to each of the cross sections.

In some embodiments of the present disclosure, based on the foregoing solutions, the multi-dimensional analyzing unit is configured to: perform the multi-dimensional analysis on the first image data by using 3D Clifford algebra to acquire the time component corresponding to the target cross section.

In some embodiments of the present disclosure, based on the foregoing solutions, the post-processing unit is configured to: determine a sub-time component corresponding to each of the cross sections at each of the time points according to the target time component, the quantity of the sub-time components being the same as the quantity of the time points; add and average the sub-time components corresponding to each of the cross sections to acquire a target average value; and construct the temporal dynamic image according to the target average values.

In some embodiments of the present disclosure, based on the foregoing solutions, the post-processing unit is configured to: determine a sub-time component corresponding to each of the cross sections at each of the time points according to the target time component, the quantity of the sub-time components being the same as the quantity of the time points; acquire a maximum value in the sub-time components corresponding to each of the cross sections; and construct the temporal dynamic image according to the maximum values in the sub-time components.

In some embodiments of the present disclosure, based on the foregoing solutions, the post-processing unit is configured to: determine a sub-time component corresponding to each of the cross sections at each of the time points according to the target time component, the quantity of the sub-time components being the same as the quantity of the time points; acquire a maximum value and a minimum value in the sub-time components corresponding to each of the cross sections, and subtract the minimum value from the maximum value to obtain a target difference; and construct the temporal dynamic image according to the target differences.

In some embodiments of the present disclosure, based on the foregoing solutions, the medical image segmentation apparatus further includes: a sample acquisition module, configured to acquire a temporal dynamic image sample and a labeled target region sample corresponding to the temporal dynamic image sample; and a training module, configured to train a to-be-trained medical image segmentation model according to the temporal dynamic image sample and the labeled target region sample, to obtain the medical image segmentation model.

In some embodiments of the present disclosure, based on the foregoing solutions, the 3D medical image is a 3D dynamic contrast enhanced magnetic resonance imaging image.

According to an aspect of the embodiments of the present disclosure, a medical image segmentation system is provided, including: a detection device, configured to scan and detect a detection object to acquire a to-be-processed medical image set, the to-be-processed medical image set comprising a plurality of to-be-processed medical images corresponding to different time points; and an electronic device, connected to the detection device, and comprising a storage apparatus and a processor, the storage apparatus being configured to store one or more programs, and the one or more programs, when executed by the processor, causing the processor to implement the foregoing medical image segmentation method.

According to an aspect of the embodiments of the present disclosure, an image segmentation method is provided, including: acquiring a to-be-processed image set, the to-be-processed image set including a plurality of to-be-processed images corresponding to different time points; processing the to-be-processed image set in a time dimension according to the to-be-processed images and the time points corresponding to the to-be-processed images to obtain a temporal dynamic image; and extracting a target region feature from the temporal dynamic image by using an image segmentation model to acquire a target region.

In some embodiments of the present disclosure, based on the foregoing solutions, when or in response to determining a plurality of the to-be-processed image sets are acquired, the to-be-processed images corresponding to the same time point in the to-be-processed image sets form a 3D image, and a plurality of the to-be-processed images corresponding to different time points form a 3D image sequence.

In the technical solutions provided by some embodiments of the present disclosure, by acquiring a to-be-processed medical image set, the to-be-processed medical image set including a plurality of to-be-processed medical images corresponding to different time points, and processing the to-be-processed medical image set in a time dimension according to the to-be-processed medical images and corresponding time points, a temporal dynamic image is obtained. The temporal dynamic image is obtained through extraction from the to-be-processed image set and may reflect changes of image data at different time points. Therefore, the temporal dynamic image may be processed by using a medical image segmentation model, to extract the target region from the temporal dynamic image. It can be seen that, in this method, a temporal dynamic image is extracted from the to-be-processed medical image set. By replacing a plurality of the to-be-processed medical images corresponding to different time points with the temporal dynamic image, the quantity of images is reduced. Under the premise of ensuring the accuracy of medical image segmentation and effectively helping doctors establish the most accurate regimen, the workload of labeling is reduced, so that the training of the medical image segmentation model is more convenient, improving diagnosis efficiency.

The foregoing general descriptions and the following detailed descriptions are merely for exemplary and explanatory purposes, and cannot limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

In addition, the described characteristics, structures, or features may be combined in one or more embodiments in any appropriate manner. In the following descriptions, a lot of specific details are provided to give a comprehensive understanding of the embodiments of the present disclosure. However, a person of ordinary skill in the art is to be aware that, the technical solutions in the present disclosure may be implemented without one or more of the particular details, or another method, unit, apparatus, or step may be used. In other cases, well-known methods, apparatuses, implementations, or operations are not shown or described in detail, to avoid obscuring the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, while some operations/steps may be combined or partially combined. Therefore, an actual execution order may change according to an actual case.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Figure 1:
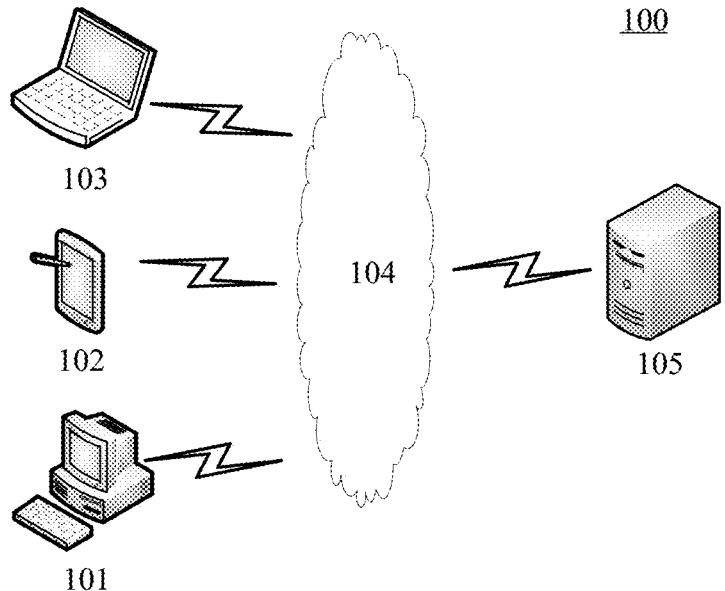
FIG. 1 is a schematic diagram of an exemplary system architecture to which a technical solution according to one or more embodiments of the present disclosure.

FIG. 1 is a schematic diagram of an exemplary system architecture to which a technical solution according to an embodiment of the present disclosure may be applied.

As shown in FIG. 1, a system architecture 100 may include a terminal device (which may be one or more of a desktop computer 101, a tablet computer 102, and a portable computer 103 shown in FIG. 1, or may be another terminal device having a display screen, or the like), a network 104, and a server 105. The network 104 is configured to provide a medium of a communication link between the terminal device and the server 105. The network 104 may include various connection types, such as, a wired communication link, a wireless communication link, and the like.

The quantities of the terminal device, the network, and the server in FIG. 1 are merely exemplary. There may be any quantities of the terminal device, the network, and the server according to an actual requirement. For example, the server 105 may be a server cluster including a plurality of servers, or the like.

In an embodiment of the present disclosure, a user may use a desktop computer 101 (or a tablet computer 102 or a portable computer 103) to upload a to-be-processed medical image set to a server 105, and to-be-processed medical images included in the to-be-processed medical image set may be any examination and detection images, such as computed tomography (CT) images, magnetic resonance imaging (MRI) images, or other examination and detection images of which image information changes over time. After acquiring the to-be-processed medical image set, the server 105 processes the to-be-processed medical image set in a time dimension according to the to-be-processed medical images and corresponding time points, so as to convert the original to-be-processed medical image set into a temporal dynamic image, and the temporal dynamic image can effectively reflect the difference between a lesion region and a non-lesion region; and then the temporal dynamic image is inputted into a trained medical image segmentation model, and a target region feature is extracted from the temporal dynamic image by using the medical image segmentation model, to acquire a target region.

Figure 11:
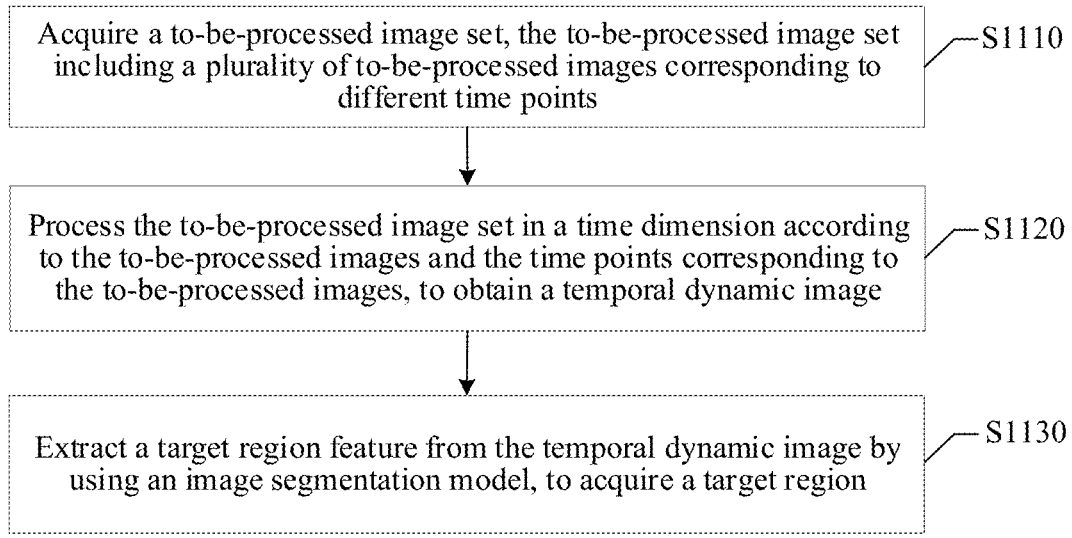
FIG. 11 is a schematic flowchart of an image segmentation method according to one or more embodiments of the present disclosure.

In one or more embodiments of the present disclosure, the term "to-be-processed image" or "to-be-processed medial image" may also be understood as an "image." In certain embodiments, the term "to-be-processed image" or "to-be-processed medial image" refers to an image that is subject to one or more steps referenced in the method according to embodiments illustratively shown at FIG. 2, FIG. 5, FIG. 6, FIG. 9, and/or FIG. 11.

In the technical solution of this embodiment, the temporal dynamic image is acquired through the processing of a plurality of to-be-processed medical image sets in a time dimension, so that the temporal dynamic image can clearly present a lesion region, thereby avoiding the need for doctors to analyze a plurality of medical images acquired at different time points to determine the lesion region, and further improving the diagnosis efficiency of the doctors. In addition, the target region in the temporal dynamic image is segmented through the medical image segmentation model, so that the segmentation precision of the lesion region can be improved, thereby providing support for the clinical diagnosis made by the doctors. Because the temporal dynamic image replaces the plurality of medical images acquired at different time points, the workload of labeling is reduced, so that the training of the medical image segmentation model is more convenient.

A medical image segmentation method provided in the embodiments of the present disclosure is generally performed by the server 105, and accordingly, a medical image segmentation apparatus is generally disposed in the server 105. However, in another embodiment of the present disclosure, the terminal device may also have functions similar to those of the server, so as to perform the medical image segmentation solution provided in the embodiments of the present disclosure.

In the related art, in order to improve the accuracy and efficiency of diagnosis, medical images at a plurality of time points usually need to be acquired. For example, when a breast magnetic resonance examination is carried out, dynamic contrast enhanced (DCE)-MRI images at a plurality of time points need to be acquired, and then an image before a contrast agent is injected is subtracted from the DCE-MRI image at each time point to obtain silhouette images. Finally, a lesion region on a tissue is determined through the clinical examination by doctors and the observation of a plurality of medical images, or the lesion region in the medical image is extracted by using a trained deep learning network model. However, there are corresponding defects in the related art. In terms of clinical diagnosis, doctors generally need to observe medical images at 3 to 5 time points, and sometimes even need to observe medical images at dozens of time points. The amount of image information is huge, for example, for data in 3 dimensions (3D) at 5 time points, there are 5×70 frames=350 2D images, and for a database of 20 time points, there are 20×128 frames=2560 2D images in one examination. It is very difficult for doctors to acquire information from so many images, and the diagnosis efficiency is quite low. In terms of a computer deep learning segmentation algorithm, if medical images at all time points are used for training a deep learning network model, due to patient movement at different time periods, it is difficult to accurately correspond to lesion regions at other time points by labeling the medical images at one time point. Therefore, it may be necessary to label the medical images at all time points or perform 3D registration on the medical images at all time points, which makes the training of the deep learning network model more difficult.

In view of the problems in the related art, a medical image segmentation method is first provided in the embodiments of the present disclosure. The implementation details of the technical solutions in the embodiments of the present disclosure are described in detail in the following.

Figure 2:
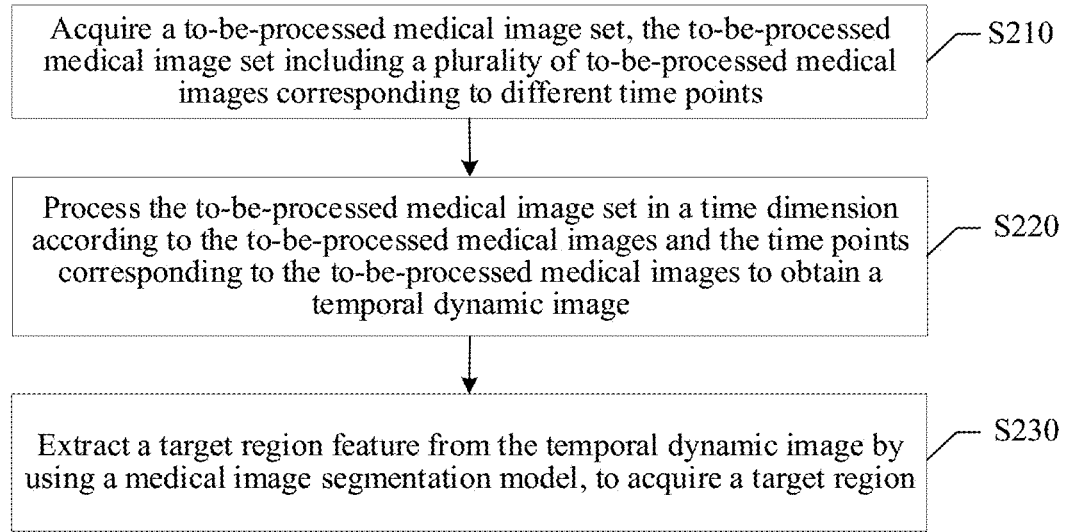
FIG. 2 is a schematic flowchart of a medical image segmentation method according to one or more embodiments of the present disclosure.

FIG. 2 is a schematic flowchart of a medical image segmentation method according to an embodiment of the present disclosure. The medical image segmentation method may be performed by a server, and the server may be the server shown in FIG. 1. Referring to FIG. 2, the medical image segmentation method at least includes S210 to S230. A detailed description is as follows.

S210. The server acquires a to-be-processed medical image set, the to-be-processed medical image set including a plurality of to-be-processed medical images corresponding to different time points.

In an embodiment of the present disclosure, the to-be-processed medical image set may be acquired by performing sample detections on samples obtained from patients or performing physical examinations on patients by hospital departments. For example, the to-be-processed medical images in the to-be-processed medical image set may be CT scan images, MRI images, X-ray images, and other images that can reflects properties of a lesion region changing over time. The type of the to-be-processed medical images is not limited in the present disclosure.

For ease of understanding of the present disclosure, an example in which an MM image is used as a to-be-processed medical image and the MM image of a breast tumor is segmented is used for description in the following. In certain embodiments, the MRI image may be further an MRI image obtained by performing MRI on a lesion region such as a lung tumor, a stomach tumor, or a liver tumor.

In an embodiment of the present disclosure, when the MM is performed on the breast tumor, an examinee is first injected with a contrast agent, then the examinee lies prone on an examination table, and the breast is placed in a special coil, and finally, with the movement of the examination table, a nuclear magnetic resonance instrument performs an overall scan on the breast. The contrast agent is a chemical injected (or taken) into human tissues or organs to enhance an image observation effect, for example, iron, manganese, and other magnetic substances. The densities of these chemicals are higher or lower than that of surrounding tissues. When these chemicals are close to hydrogen atoms in the resonance, the magnetic field of protons can be effectively changed, causing relaxation times of T1 (longitudinal relaxation) and T2 (transverse relaxation) to be significantly shortened. The contrast agent can change a relaxation rate of water protons in local tissues in the body, improve an imaging contrast ratio and resolution ratio of a non-lesion region and a lesion region, and provide more information for location and diagnosis of the lesion region. In certain embodiments, the content of the contrast agent in the tissue changes with the flow of blood. For example, blood circulation in the non-lesion region is smooth, the content of the contrast agent decreases rapidly, and the brightness of a region corresponding to the non-lesion region in the magnetic resonance image gradually becomes higher. However, blood circulation in the lesion region is poor, the content of the contrast agent decreases slowly, and the brightness of a region corresponding to the lesion region in the magnetic resonance image changes slowly, which forms a clear contrast with the brightness of the non-lesion region. Therefore, in the present disclosure, the to-be-processed medical images at a plurality of time points may be acquired for the same tissue cross section based on the foregoing features of the contrast agent.

In the embodiments of the present disclosure, the server may acquire one or more to-be-processed medical image sets. When the server acquires one to-be-processed medical image set, medical image segmentation may be performed on a 2D image. When the server acquires a plurality of to-be-processed medical image sets, each of the to-be-processed medical image sets corresponds to a cross section, and the to-be-processed medical images corresponding to the same time point in the to-be-processed medical image sets form a 3D medical image, and in this case, the medical image segmentation may be performed on a 3D image. Medical image segmentation on the 3D image is mainly described in the embodiments of the present disclosure.

In an embodiment of the present disclosure, if the server acquires a plurality of to-be-processed medical image sets, and each of the to-be-processed medical image sets includes a plurality of to-be-processed medical images corresponding to different time points, that is, the to-be-processed medical image sets correspond to different cross sections, and the to-be-processed medical images in the same to-be-processed medical image set are images obtained when acquiring information about the same cross section at different time points. For example, when acquiring an MRI image of a breast tumor, the plurality of to-be-processed medical image sets are image sets obtained when different cross sections of the breast are scanned by a nuclear magnetic resonance imager during a scanning process, and the plurality of to-be-processed medical images in the same to-be-processed medical image set are images generated when a certain cross section of the breast is scanned at a plurality of time points by the nuclear magnetic resonance imager during the scanning process. Further, time points corresponding to the plurality of to-be-processed medical images may be consecutive time points, and a medical image sequence may be formed by using the plurality of to-be-processed medical image sets.

The technical solutions in the present disclosure reduce the workload of labeling while ensuring the precision of medical image segmentation, so that the training of the medical image segmentation model is more convenient, and the diagnosis efficiency is improved.

Figure 3:
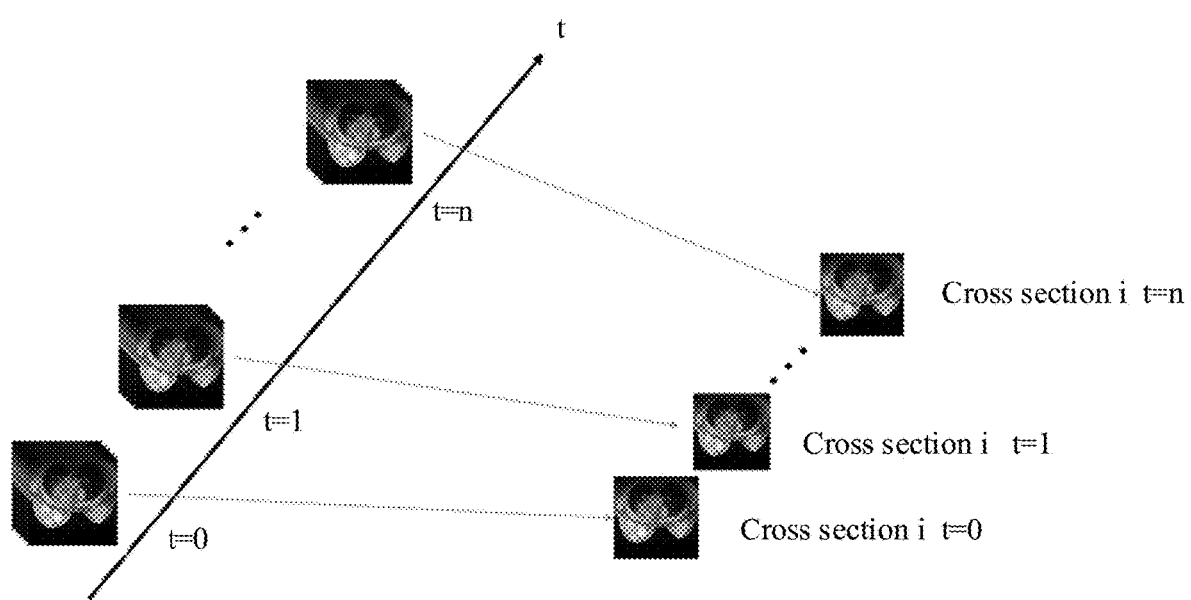
FIG. 3 is a schematic structural diagram of to-be-processed medical images corresponding to a plurality of different time points in a to-be-processed medical image set according to one or more embodiments of the present disclosure.

FIG. 3 is a schematic structural diagram of to-be-processed medical images corresponding to a plurality of different time points in a to-be-processed medical image set. As shown in FIG. 3, a cross section marked i includes n+1 to-be-processed medical images, and the n+1 to-be-processed medical images correspond to different time points t=0, 1, . . . , n.

In an embodiment of the present disclosure, the to-be-processed medical images corresponding to the same time point in the to-be-processed medical image sets may form a 3D medical image. For example, when performing MRI on a breast tumor, an image formed by to-be-processed medical images corresponding to the same time point in to-be-processed medical image sets is a 3D MRI image. Because each of the to-be-processed medical image sets includes to-be-processed medical images at a plurality of time points, the plurality of to-be-processed medical image sets may form a 3D MRI image sequence. Further, DCE-MRI may be performed on the breast tumor, and a 3D DCE-MRI image may be acquired. A medical image sequence formed by the plurality of to-be-processed medical image sets is a 3D DCE-MRI image sequence. In certain embodiments, the medical image sequence may alternatively be a two-dimensional image sequence. Most of medical images in clinical diagnosis are 3D medical images. Therefore, description is made in the following mainly by using a 3D DCE-MRI image sequence as an example.

S220. Process the to-be-processed medical image set in a time dimension according to the to-be-processed medical images and the time points corresponding to the to-be-processed medical images to obtain a temporal dynamic image.

Figure 4:
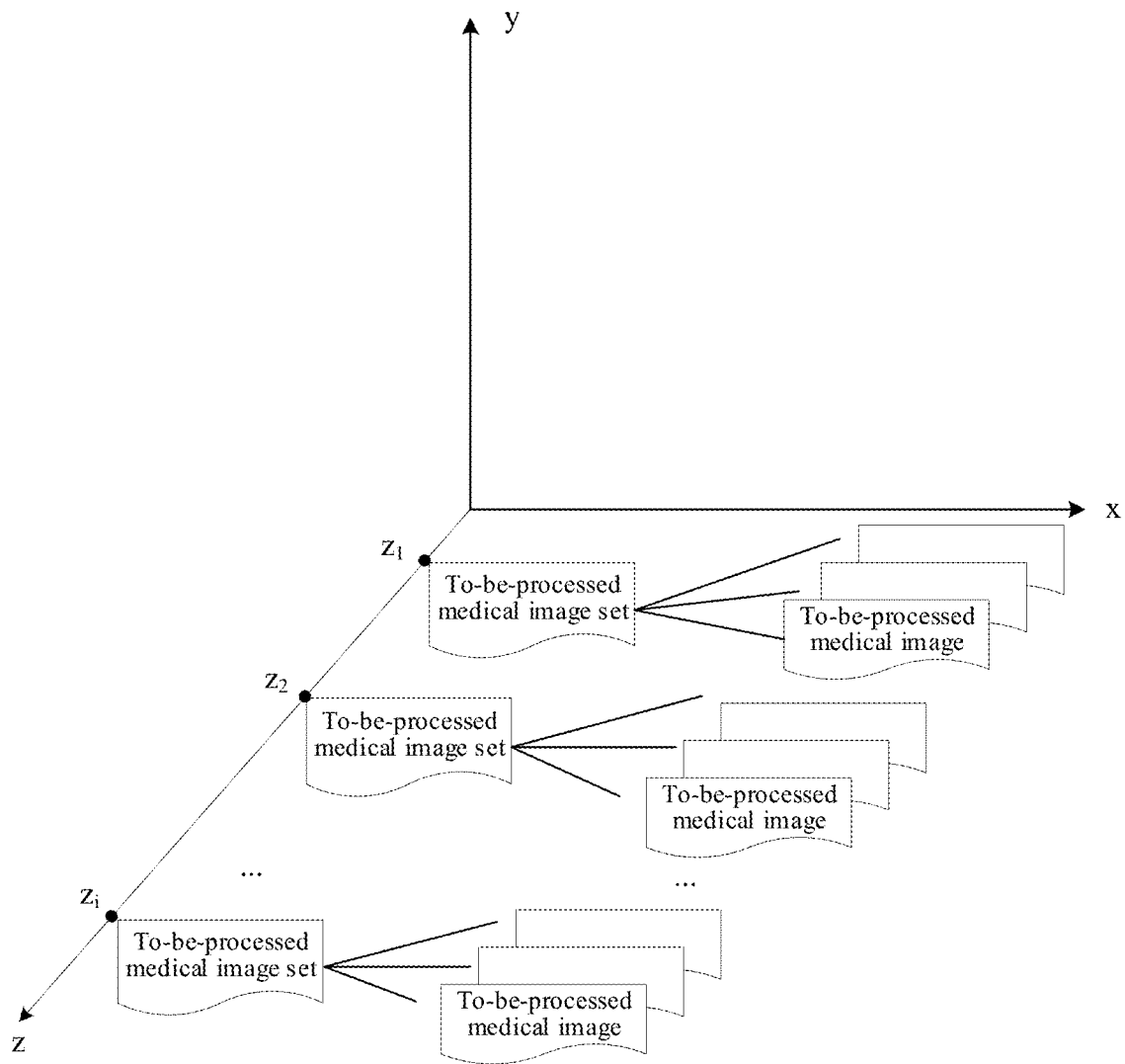
FIG. 4 is a schematic distribution diagram of a cross section according to one or more embodiments of the present disclosure.

In an embodiment of the present disclosure, after the plurality of to-be-processed medical images corresponding to different time points are acquired, the to-be-processed medical image set may be processed in a time dimension according to the to-be-processed medical images and the corresponding time points to acquire the temporal dynamic image. Before the to-be-processed medical image set is processed in a time dimension, a coordinate plane corresponding to a cross section and a cross section coordinate axis may be determined according to three dimensions of the 3D medical image. A coordinate system corresponding to the 3D medical image may be a 3D Cartesian coordinate system. When the coordinate plane and the cross section coordinate axis are determined, any coordinate axis may be selected as the cross section coordinate axis, and a coordinate plane perpendicular to the cross section coordinate axis is the coordinate plane corresponding to the cross section. FIG. 4 is a schematic distribution diagram of a cross section. In the 3D Cartesian coordinate system (x, y, z), the z-axis may be defined as the cross section coordinate axis, that is, the to-be-processed medical image sets are distributed along the z-axis, and the x-y coordinate plane is the coordinate plane corresponding to the cross section, that is, any to-be-processed medical image is an image on the x-y coordinate system.

Figure 5:
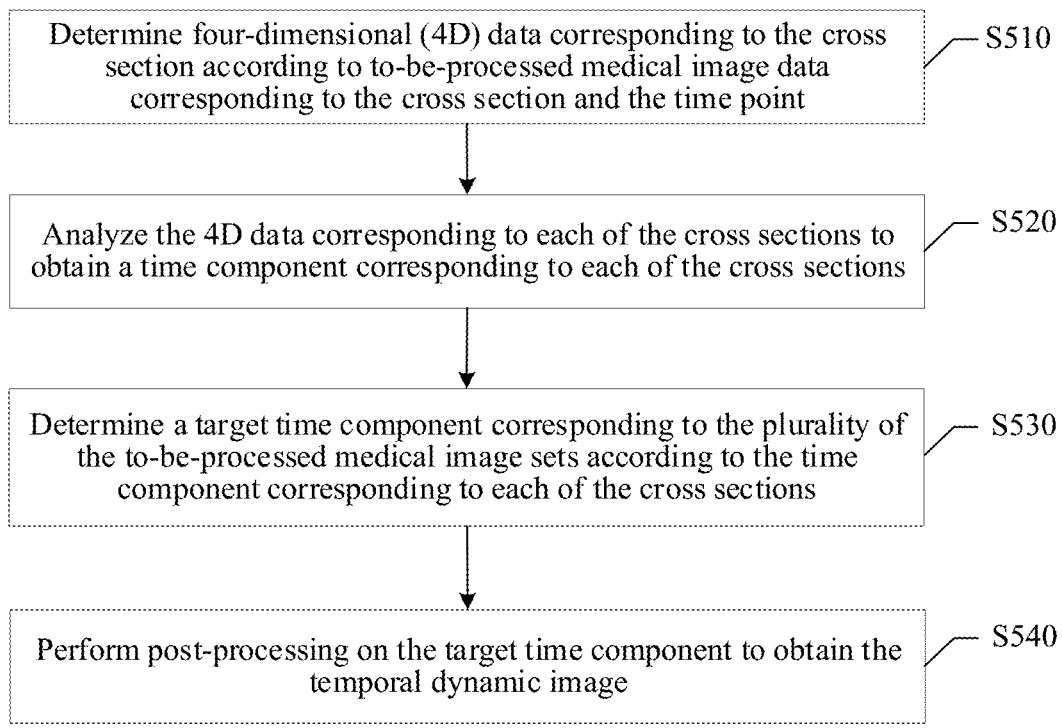
FIG. 5 is a schematic flowchart of acquiring a temporal dynamic image according to one or more embodiments of the present disclosure.

In an embodiment of the present disclosure, FIG. 5 is a schematic flowchart of acquiring a temporal dynamic image. As shown in FIG. 5, the process of processing the to-be-processed medical image set in a time dimension according to the to-be-processed medical images and the corresponding time points to obtain the temporal dynamic image includes S510 to S540 as follows, and a detailed description is made as follows.

S510. Determine 4D data corresponding to the cross section according to to-be-processed medical image data corresponding to the cross section and the time point.

In an embodiment of the present disclosure, each cross section corresponds to the to-be-processed medical images at the plurality of time points, and coordinates corresponding to the cross sections may be different. Therefore, a first coordinate, a second coordinate, and a cross section coordinate may be first determined according to the to-be-processed medical image data corresponding to the cross section, the first coordinate, the second coordinate, and the cross section coordinate being perpendicular to each other, and the first coordinate and the second coordinate forming the coordinate plane corresponding to the cross section, then a time coordinate is determined according to the time point, and finally, 4D coordinate axes are formed according to the first coordinate, the second coordinate, the cross section coordinate, and the time coordinate, and 4D data is determined according to the 4D coordinate axes. Still referring to the 3D Cartesian coordinate system shown in FIG. 4, the first coordinate may be the x-axis, the second coordinate may be the y-axis, and the cross section coordinate may be the z-axis. The time coordinate t may be determined according to the time points corresponding to the to-be-processed medical images, and then a 4D coordinate system (x, y, z, t) may be determined according to the first coordinate, the second coordinate, the cross section coordinate, and the time coordinate. 4D data I(x, y, z, t) corresponding to the plurality of to-be-processed medical image sets may further be determined according to the 4D coordinate system, and then 4D data corresponding to a cross section of which the cross section coordinate is z=i is I(x, y, i, t).

S520. Analyze the 4D data corresponding to each of the cross sections to obtain a time component corresponding to each of the cross sections.

Figure 6:
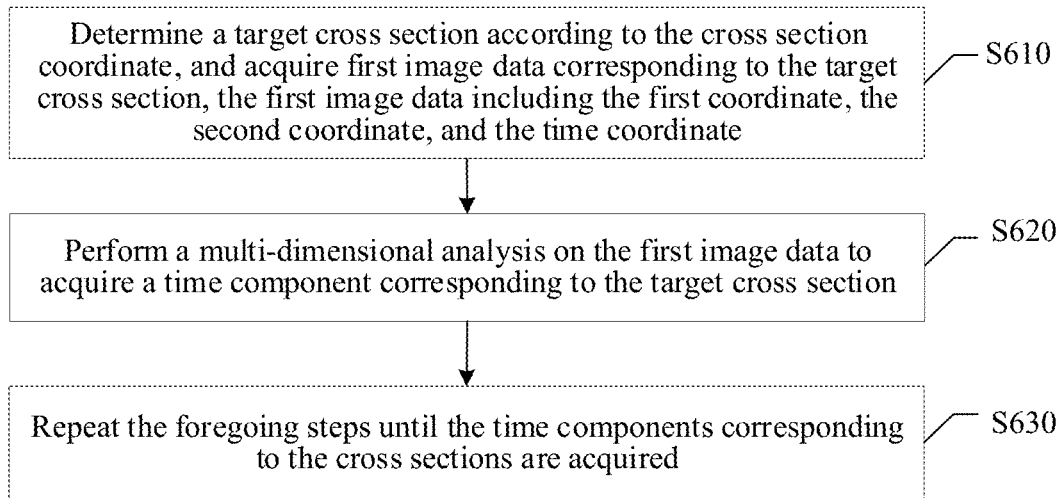
FIG. 6 is a schematic flowchart of acquiring, by mining topic words and viewpoint words included in target text data, a target topic word and a target viewpoint word with a confidence level higher than a preset value according to one or more embodiments of the present disclosure.

In an embodiment of the present disclosure, FIG. 6 is a schematic flowchart of acquiring the time component corresponding to each of the cross sections. As shown in FIG. 6, the process of acquiring the time component corresponding to each of the cross sections includes S610 to S630 as follows, and a detailed description is as follows.

S610. Determine a target cross section according to the cross section coordinate, and acquire first image data corresponding to the target cross section, the first image data including the first coordinate, the second coordinate, and the time coordinate.

In an embodiment of the present disclosure, a coordinate value i from the z-axis may be determined as the cross section coordinate, and the corresponding target cross section is acquired according to the cross section coordinate. The target cross section includes a plurality of the to-be-processed medical images corresponding to different time points. The first image data may be determined by counting image data of the to-be-processed medical images, and includes the first coordinate, the second coordinate, and the time coordinate that correspond to each of the to-be-processed medical images, that is, the first image data corresponding to the target cross section of which the cross section coordinate is z=i is f(x, y, t).

S620. Perform a multi-dimensional analysis on the first image data to acquire a time component corresponding to the target cross section.

In an embodiment of the present disclosure, to process the to-be-processed medical images in a time dimension, the multi-dimensional analysis may be performed on the first image data to acquire the component of the first image data in the time dimension.

In certain embodiments, 3D Clifford algebra may be used for calculating a multi-dimensional analytic signal $\psi(x, y, t)$ of the first image data $f(x, y, t)$, so as to split an original signal into components in different dimensions. Clifford algebra, also known as geometric algebra, combines two operations of inner product and outer product, is a generalization of complex algebra, quaternion algebra, and outer algebra, and has wide application in geometry and physics. The multi-dimensional analytic signal $\psi(x, y, t)$ obtained by the 3D Clifford algebra calculation is as follows:

$$\psi(x, y, t) = f(x, y, t) *** \left\{ \left[\sigma(x) + \frac{e_1}{\pi x}\right]\left[\sigma(y) + \frac{e_2}{\pi y}\right]\left[\sigma(t) + \frac{e_3}{\pi t}\right] \right\} =$$

-continued
$$f(x, y, t) * \{\sigma(x)\sigma(y)\sigma(t)\} + f(x, y, t) * \left\{\sigma(x)\sigma(y)\frac{e_3}{\pi t}\right\} +$$
$$f(x, y, t) * \left\{\sigma(x)\frac{e_2}{\pi y}\sigma(t)\right\} + f(x, y, t) * \left\{\sigma(x)\frac{e_2}{\pi y}\frac{e_3}{\pi t}\right\} +$$
$$f(x, y, t) * \left\{\frac{e_1}{\pi x}\sigma(y)\sigma(t)\right\} + f(x, y, t) * \left\{\frac{e_1}{\pi x}\sigma(y)\frac{e_3}{\pi t}\right\} +$$
$$f(x, y, t) * \left\{\frac{e_1}{\pi x}\frac{e_2}{\pi y}\sigma(t)\right\} + f(x, y, t) * \left\{\frac{e_1}{\pi x}\frac{e_2}{\pi y}\frac{e_3}{\pi t}\right\}$$

where "***" represents 3D convolution calculation, $e_1$, $e_2$, and $e_3$ are three generators of imaginary units of the 3D Clifford algebra, and $\sigma(\cdot)$ is Dirac function.

It can be seen from the foregoing formula that the formula includes eight components. A direction of each component is determined by $e_1$, $e_2$, and $e_3$, and the eight components are mutually orthogonal in Clifford algebraic space. $e_1$ corresponds to information in an x direction in the space of the first image data f(x, y, t), $e_2$ corresponds to information in a y direction in the space of the first image data f(x, y, t), and $e_3$ corresponds to information in a t direction in the space of the first image data f(x, y, t). For the first image data, the information in the t direction is what to be concerned. Therefore, the component $f(x, y, t)*\{\sigma(x)\sigma(y) e_3/(\pi t)\}$ may be extracted from the multi-dimensional signal $\psi(x, y, t)$ as the time component corresponding to the target cross section, which may be written as the time component f(x, y, t)=f(x, y, t)*{σ(x)σ(y) $e_3$/(πt)}.

S630. Repeat the foregoing steps until the time components corresponding to the cross sections are acquired.

In an embodiment of the present disclosure, S610 and S620 may be repeated to obtain the time components corresponding to the cross sections. In certain embodiments, all cross section coordinates z=i on the cross section coordinate axis and the first image data fi(x, y, t) of the cross sections corresponding to all cross section coordinates i may be acquired according to the method in S610, and the first image data fi(x, y, t) of the cross sections is analyzed according to the method in S620 to acquire the time components fi'(x, y, t) corresponding to the cross sections.

S530. Determine a target time component corresponding to the plurality of the to-be-processed medical image sets according to the time component corresponding to each of the cross sections.

In an embodiment of the present disclosure, after the time component corresponding to each of the cross sections is obtained, the target time component I'(x, y, z, t) corresponding to the 4D data I(x, y, z, t) corresponding to the plurality of cross sections (the to-be-processed medical image sets) may be determined according to the cross section coordinate z=i and the corresponding time component fi'(x, y, t), where when z=i, I'(x, y, z=i, t)=fi'(x, y, t).

S540. Perform post-processing on the target time component to obtain the temporal dynamic image.

In an embodiment of the present disclosure, after the target time component corresponding to the plurality of to-be-processed medical image sets is acquired, post-processing may be performed on the target time component to acquire the 3D temporal dynamic image. In this embodiment of the present disclosure, there are many post-processing methods. For example, an average value of the target time component I'(x, y, z, t) along the t-axis may be calculated, a maximum value of the target time component I'(x, y, z, t) along the t-axis may be calculated, or a difference between the maximum value and a minimum value of the target time component I'(x, y, z, t) along the t-axis may be calculated.

The post-processing may alternatively be performed on the target time component I'(x, y, z, t) in other manners. This is not repeated in the present disclosure.

In an embodiment of the present disclosure, a specific process of calculating the average value of the target time component I'(x, y, z, t) along the t-axis includes: determining a sub-time component corresponding to each of the cross sections at each of the time points according to the target time component, the quantity of sub-time components being the same as the quantity of time points; then adding and averaging the sub-time components corresponding to each of the cross sections to acquire a target average value; and finally, constructing the temporal dynamic image according to the target average values. A specific calculation formula of the temporal dynamic image is shown as formula (1):

$$I_t(x,y,z)=[I'(x,y,z,t=t_1)+I'(x,y,z,t=t_2)+ \ldots +I'(x,y,z,t=t_n)]/n \quad (1)$$

In an embodiment of the present disclosure, a specific process of calculating the maximum value of the target time component I'(x, y, z, t) along the t-axis includes: determining a sub-time component corresponding to each of the cross sections at each of the time points according to the target time component, the quantity of sub-time components being the same as the quantity of time points; then acquiring the maximum value in the sub-time components corresponding to each of the cross sections; and finally, constructing the temporal dynamic image according to the maximum values in the sub-time components. A specific calculation formula of the temporal dynamic image is shown as formula (2):

$$I_t(x,y,z)=\text{Max}(I'(x,y,z,t))|t=t_1,t_2,\ldots,t_n \quad (2)$$

In an embodiment of the present disclosure, a specific process of calculating the difference between the maximum value and a minimum value of the target time component I'(x, y, z, t) along the t-axis includes: determining a sub-time component corresponding to each of the cross sections at each time point according to the target time component, the quantity of sub-time components being the same as the quantity of time points; then acquiring the maximum value and the minimum value in the sub-time components corresponding to each of the cross sections, and subtracting the minimum value from the maximum value to obtain a target difference; and finally, constructing the temporal dynamic image according to the target differences. A specific calculation formula of the temporal dynamic image is shown as formula (3):

$$I_t(x,y,z)=\text{Max}(I'(x,y,z,t))|t=t_1,t_2,\ldots,t_n-\text{Min}(I'(x,y,z,t))|t=t_1,t_2,\ldots,t_n \quad (3)$$

According to the foregoing method, the 3D temporal dynamic image $I_t(x, y, z)$ may be obtained according to the calculation result. In certain embodiments, a change of pixel brightness of a plurality of 3D DCE-MRI images at different times is obtained. The difference between the maximum value and the minimum value of the sub-time component reflects the difference between the maximum value and the minimum value obtained at different time points of a 3D DCE-MRI image sequence at the same spatial position, and the difference can display a brightness change of points in the space to the greatest extent. Therefore, in this embodiment of the present disclosure, the temporal dynamic image may be constructed according to the target differences by using the target difference as a reference, so as to improve the efficiency of medical image segmentation.

Still refer to FIG. 2. S230. Extract a target region feature from the temporal dynamic image by using a medical image segmentation model, to acquire a target region.

In an embodiment of the present disclosure, after the temporal dynamic image is acquired, the temporal dynamic image may be inputted into a trained medical image segmentation model, and the target region feature is extracted from the temporal dynamic image by using the medical image segmentation model, to acquire the target region. If a plurality of to-be-processed medical image sets are acquired in S210, that is, a 3D medical image is segmented, and the temporal dynamic image is a 3D temporal dynamic image. The medical image segmentation model may be a trained deep learning segmentation module. For the 3D temporal dynamic image in the present disclosure, the medical image segmentation model may be a deep learning segmentation module specially used for processing a 3D image, for example, the medical image segmentation model may be a 3D Unet model, a 3D vnet model, or a fully convolutional neural network model. The type of the deep learning segmentation module is not limited in the embodiments of the present disclosure. The target region is a lesion region such as a tumor region, or a calcification region. Medical workers may take the target region as a region of interest, and further analyzes the region of interest, so as to make the optimal regimen.

Figure 7A:
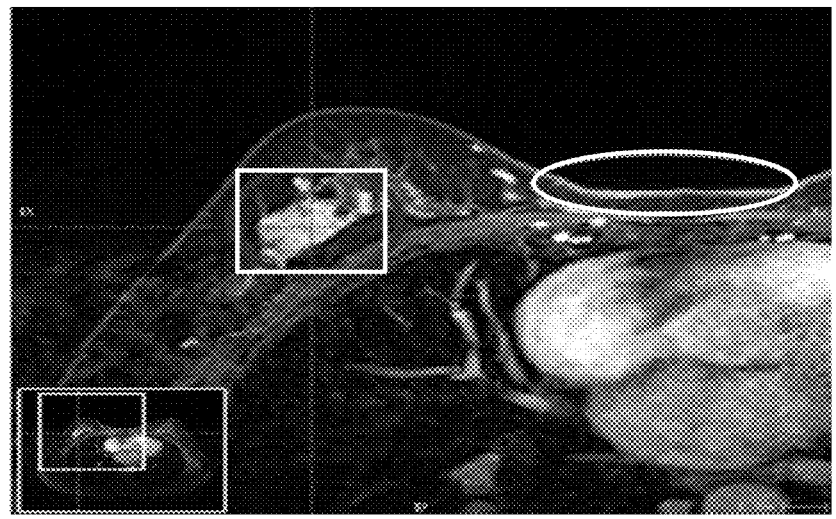
FIG. 7A to 7C are dynamic contrast enhanced magnetic resonance imaging (DCE-MRI) images at a certain time point after a contrast agent is injected in the related art.
Figure 7B:
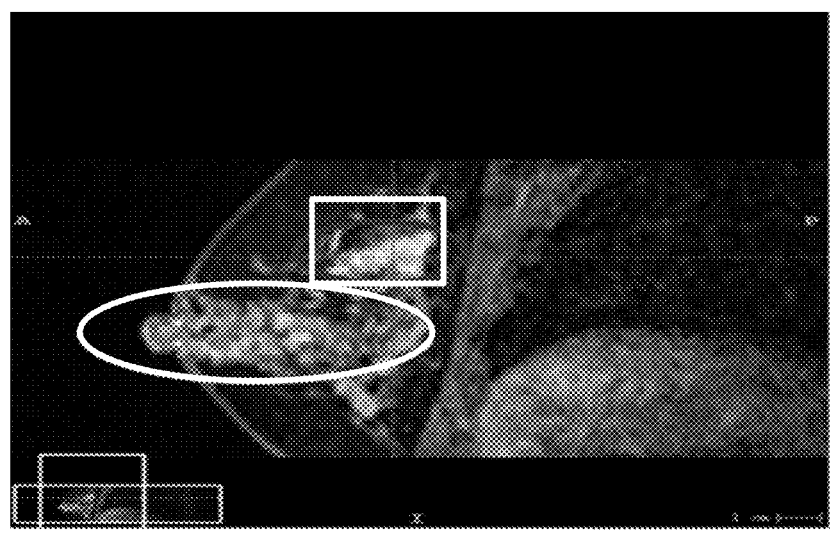
Figure 7C:
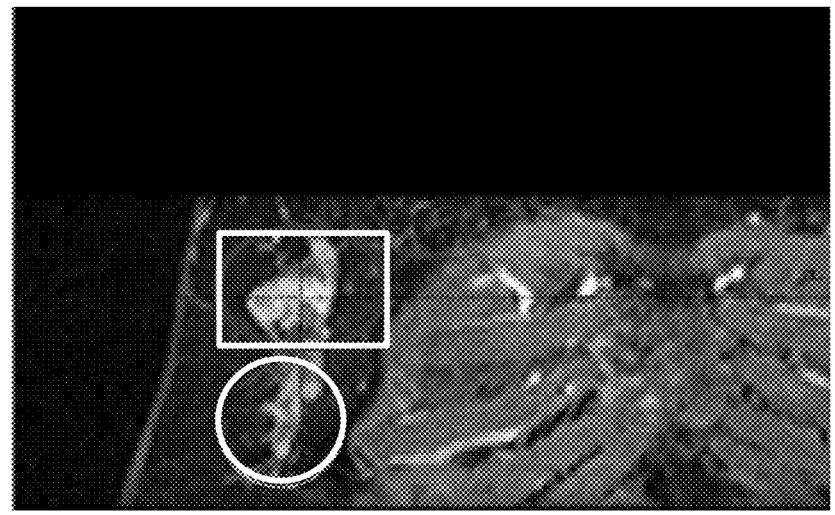

FIG. 7A to 7C show DCE-MRI images at a certain time point after a contrast agent is injected in the related art. As shown in FIG. 7A to 7C, FIG. 7A is a cross section image of a breast, and the cross section is a longitudinal section that divides a body into upper and lower parts; FIG. 7B is a sagittal plane image of the breast, and the sagittal plane is a longitudinal section that divides the body into left and right parts; and FIG. 7C is a coronal plane image of the breast, and the coronal plane is a longitudinal section that divides the body into front and rear parts. Rectangular frames in FIG. 7A to 7C are lesion regions, and elliptical frames are non-lesion regions. It can be seen from FIG. 7A to 7C that both the lesion regions and the non-lesion regions are presented as bright pixels, and a medical image segmentation model cannot distinguish the lesion regions from the non-lesion regions, and thus cannot accurately segment the lesion regions.

Figure 8A:
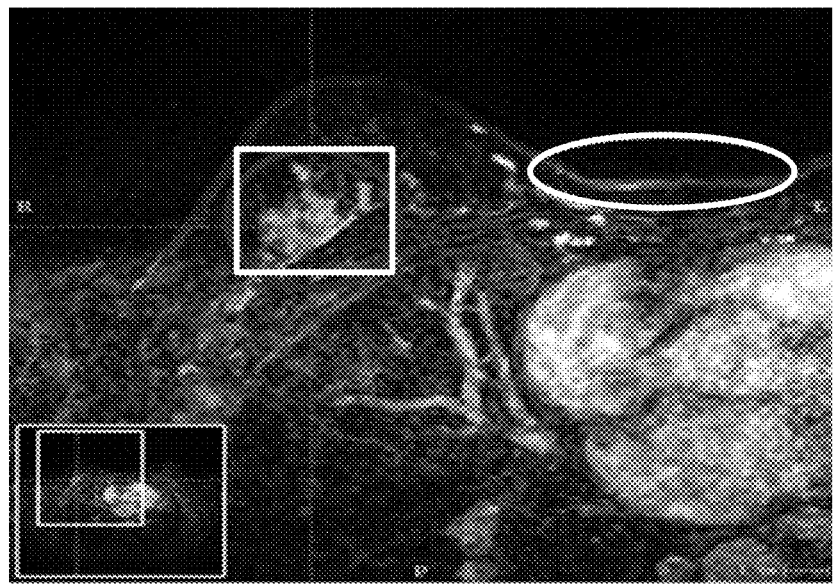
FIG. 8A to 8C are 3D temporal dynamic images after a contrast agent is injected according to one or more embodiments of the present disclosure.
Figure 8B:
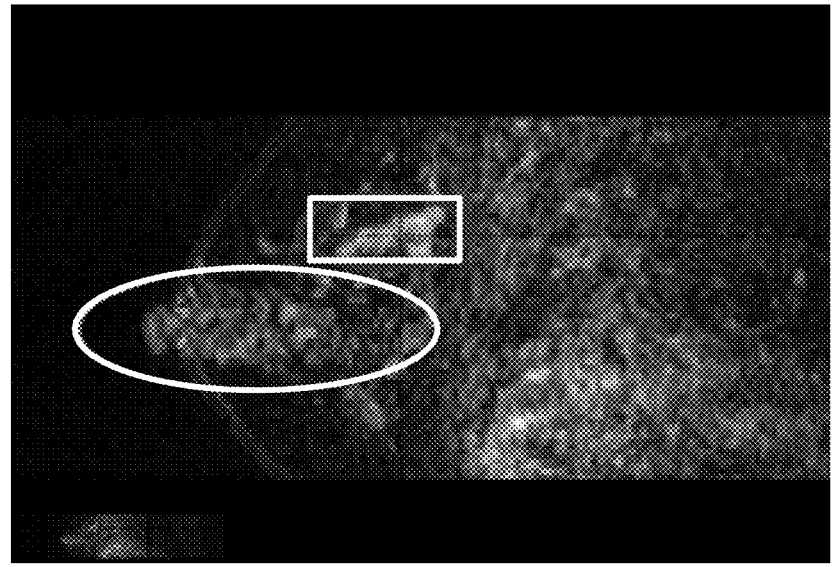
Figure 8C:
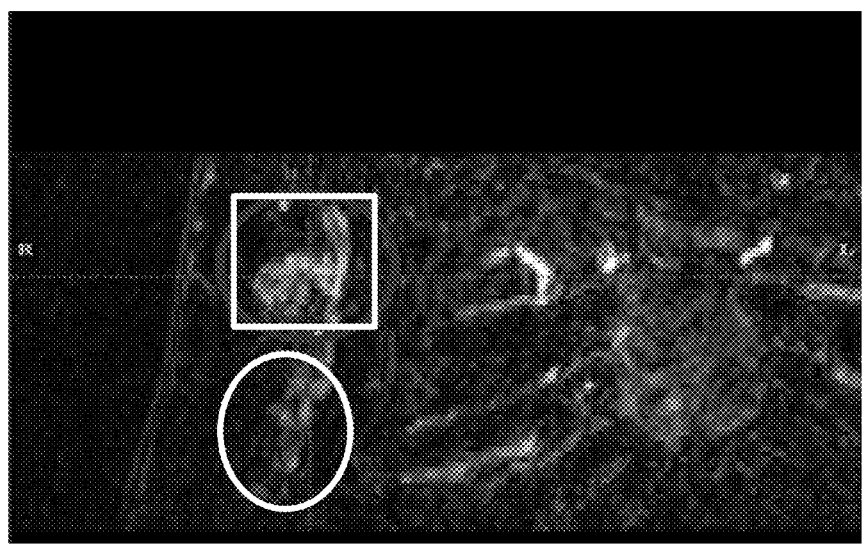

FIG. 8A to 8C show 3D temporal dynamic images after a contrast agent is injected. As shown in FIG. 8A to 8C, FIG. 8A is a cross section image of a breast; FIG. 8B is a sagittal plane image of the breast; and FIG. 8C is a coronal plane image of the breast. Rectangular frames in FIG. 8A to 8C are lesion regions, and elliptical frames are non-lesion regions. Compared with the DCE-MRI images shown in FIG. 7A to 7C, the pixel brightness of the lesion regions in FIG. 8A to 8C is higher, and the pixel brightness of the non-lesion regions is lower. Therefore, the contrast between the pixels of the lesion regions and the non-lesion regions is more obvious, and a medical image segmentation model can quickly distinguish the lesion regions from the non-lesion regions, and can further accurately segment the lesion regions.

In an embodiment of the present disclosure, before the temporal dynamic image is inputted into the medical image segmentation model, and a target region feature is extracted from a temporal dynamic image by using the medical image segmentation model, to acquire the target region, a to-be-trained medical image segmentation model may further be trained, so as to acquire a medical image segmentation model for subsequent image segmentation on the to-be-processed medical image.

Figure 9:
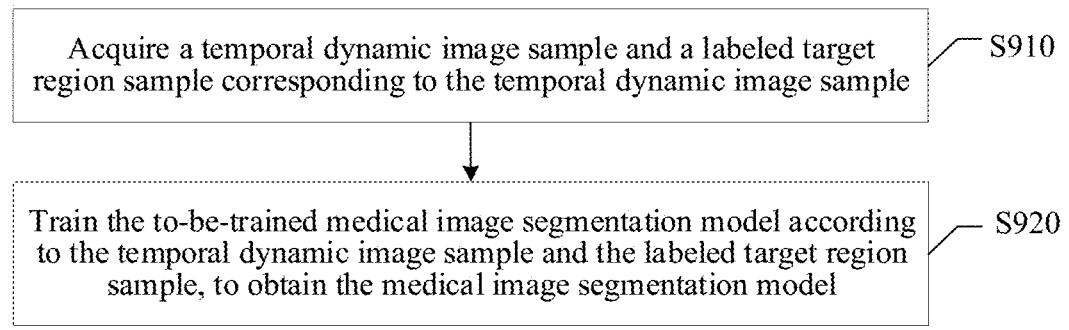
FIG. 9 is a schematic flowchart of training a to-be-trained medical image segmentation model according to one or more embodiments of the present disclosure.

FIG. 9 is a schematic flowchart of training a to-be-trained medical image segmentation model. As shown in FIG. 9, a process of training the to-be-trained medical image segmentation model includes S910 to S920 as follows. A detailed description is as follows.

S910. Acquire a temporal dynamic image sample and a labeled target region sample corresponding to the temporal dynamic image sample.

In an embodiment of the present disclosure, a method of acquiring the temporal dynamic image sample is the same as that of acquiring the temporal dynamic image in the foregoing embodiments. Details are not repeated herein. After the temporal dynamic image sample is obtained, a target region (a lesion region) in the temporal dynamic image may be labeled manually, so as to obtain the labeled target region sample corresponding to the temporal dynamic image sample.

In an embodiment of the present disclosure, in order to improve the stability of the medical image segmentation model and converge a loss function of the medical image segmentation model, a plurality of samples may be used for training the to-be-trained medical image segmentation model to acquire optimal parameters of the to-be-trained medical image segmentation model. In certain embodiments, 3D DCE-MRI image data of 244 malignant tumor patients may be selected. 221 cases of data are used as training data to train the to-be-trained medical image segmentation model, and 23 cases of data are used as test data to test the trained medical image segmentation model to determine whether the model reaches a stable state. In certain embodiments, quantities of groups of training data and test data in the present disclosure include but are not limited to the foregoing examples. This is not limited in the present disclosure.

S920. Train the to-be-trained medical image segmentation model according to the temporal dynamic image sample and the labeled target region sample, to obtain the medical image segmentation model.

In an embodiment of the present disclosure, after the temporal dynamic image sample and the corresponding labeled target region sample, the temporal dynamic image sample may be input to the to-be-trained medical image segmentation model to acquire the target region extracted from the to-be-trained medical image segmentation model; and then the extracted target region is compared with the labeled target region sample corresponding to the input dynamic image sample to determine the segmentation accuracy of the to-be-trained medical image segmentation model. If the segmentation accuracy is greater than or equal to a preset threshold, it indicates that the to-be-trained medical image segmentation model reaches a stable state and may be used as a medical image segmentation model for subsequent medical image segmentation; and if the segmentation accuracy does not reach the preset threshold, the parameters of the to-be-processed medical image segmentation model continues to be adjusted to enable the segmentation accuracy of the output segmented image to reach or exceed the preset threshold. The preset threshold may be set according to actual needs, for example, may set to 95%. After the training is performed, the trained medical image segmentation model may be tested through test data to determine whether the model is widely applicable to any temporal dynamic image.

In an embodiment of the present disclosure, the segmentation accuracy of the lesion region segmented according to the technical solutions of the embodiments of the present disclosure is greatly improved compared with that of a lesion region obtained in a manner in which a to-be-processed medical image is segmented by a medical image segmentation model trained by using original DCE-MRI data. Table 1 shows experimental results of using the original DCE-MRI data and the 3D temporal dynamic image as follows:

TABLE 1

| | Experimental result of using the original DCE-MRI data | Experimental result of using the 3D temporal dynamic image |
| --- | --- | --- |
| Segmentation precision: mean value +/− variance | 68.8 +/− 19.8% | 79.3% +/− 8.5% |

Through the analysis of Table 1, it can be seen that the segmentation accuracy of using the 3D temporal dynamic image in this embodiment of the present disclosure is 10% on average higher than that of using the original DCE-MRI data. That is, the technical solutions in the embodiments of the present disclosure can effectively improve diagnosis efficiency of doctors and the segmentation accuracy of medical images.

Figure 10A:
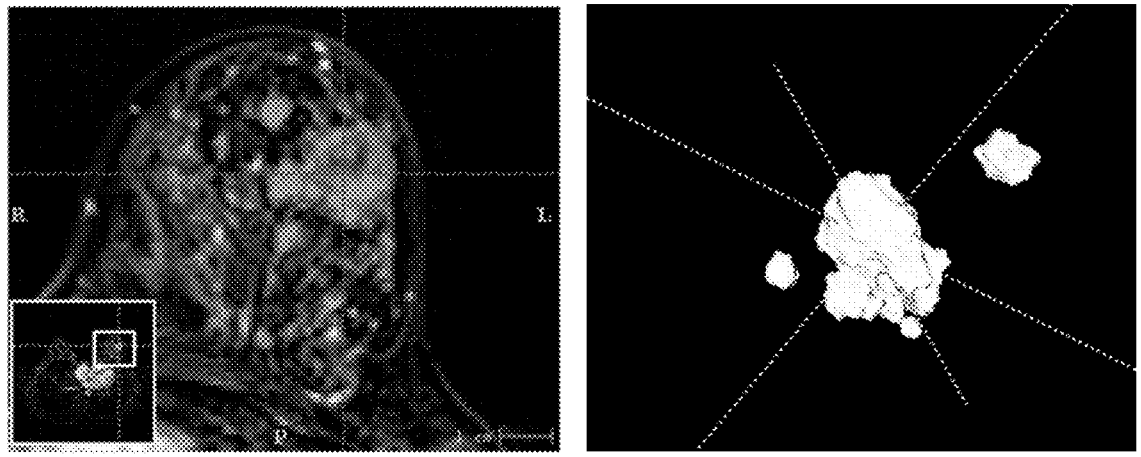
FIG. 10A to 10C are schematic diagrams of interfaces of performing tumor segmentation on a medical image of a background-enhanced type according to one or more embodiments of the present disclosure.
Figure 10B:
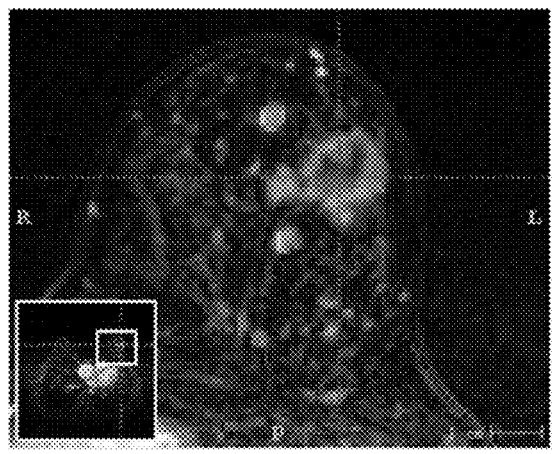
Figure 10B:
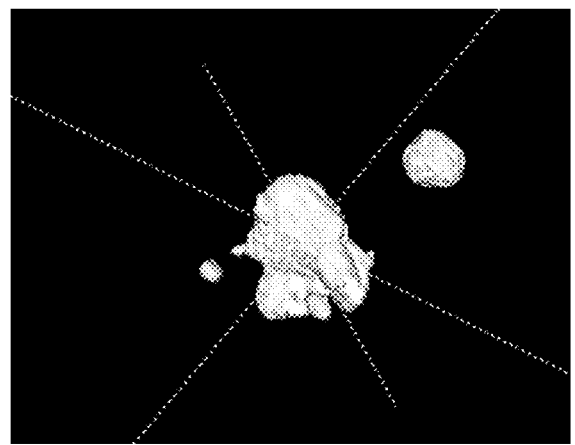
Figure 10C:
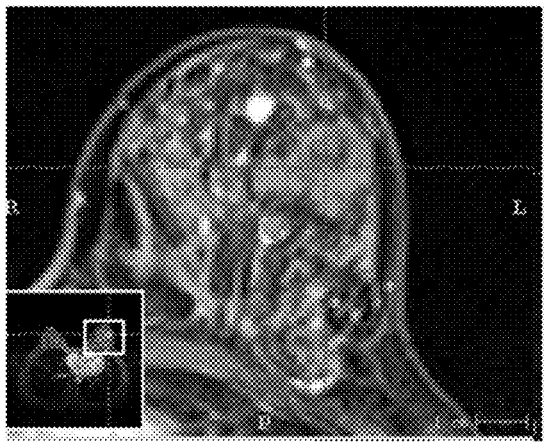
Figure 10C:
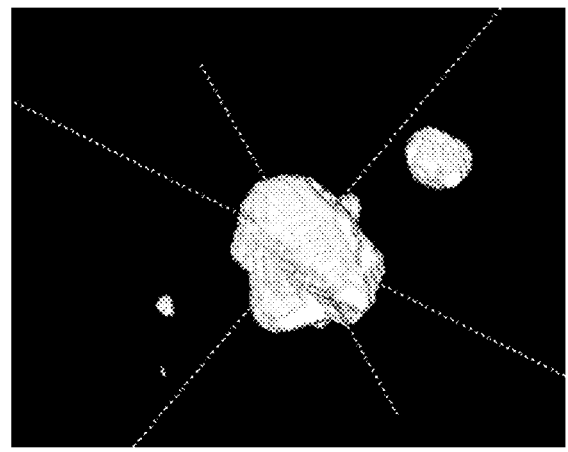

In an embodiment of the present disclosure, a segmentation result of a relatively complex background-enhancement-type medical image may further be improved by using the 3D temporal dynamic image in the technical solutions in the embodiments of the present disclosure. FIG. 10A to 10C show schematic diagrams of interface of performing tumor segmentation on a background-enhancement-type medical image. As shown in FIG. 10A to 10C, FIG. 10A shows a labeling result of a background-enhancement-type medical image; FIG. 10B shows a segmentation result of a background-enhancement-type medical image by using a 3D temporal dynamic image, and the segmentation accuracy of this method reaches 87%; and FIG. 10C shows a segmentation result of a background-enhancement-type medical image by using original DCE-MRI data, and the segmentation accuracy of this method is 69%. In view of the above, the technical solutions in the embodiments of the present disclosure can improve the precision of medical image segmentation, can be used for segmenting various types of medical images, and have wider application.

A group of 3D data (a temporal dynamic image) can be extracted from a plurality of groups of 3D DCE-MRI data by using the technical solutions in the foregoing embodiments of the present disclosure, to be directly used for target region labeling and medical image segmentation model training, so that the training of the medical image segmentation model is more convenient, and a case that doctors may need to choose which one of 3D DCE-MRI images at time points to read first when performing MM image diagnosis can be avoided. Instead, doctors may first watch 3D images acquired by using the technical solutions in the embodiments of the present disclosure to observe a lesion region, and then select 3D DCE-MRI images at some time points, thereby improving diagnosis efficiency.

In an embodiment of the present disclosure, an image segmentation method is further provided. FIG. 11 shows a flowchart of an image segmentation method as follows: S1110. Acquire a to-be-processed image set, the to-be-processed image set including a plurality of to-be-processed images corresponding to different time points. S1120. Process the to-be-processed image set in a time dimension according to the to-be-processed images and the time points corresponding to the to-be-processed images, to obtain a temporal dynamic image. S1130. Extract a target region feature from the temporal dynamic image by using an image segmentation model, to acquire a target region.

The image segmentation method is similar to the medical image segmentation method in the foregoing embodiments. However, the method can not only segment medical images, but also can be used for segmenting any other types of images, for example, segmenting a sample image in a biological experiment, segmenting an image in a metal processing process, and segmenting a damage location in a pipeline. As long as a changing trend of features of some regions in the image are different from that of features of other regions over time, the image segmentation method in the embodiments of the present disclosure can be used for segmentation. Further, the image segmentation method may be implemented by specific implementations of the medical image segmentation method in the embodiments of the present disclosure. Therefore, details are not repeated in the present disclosure.

In an embodiment of the present disclosure, when or in response to determining a plurality of to-be-processed image sets are acquired, the to-be-processed images corresponding to the same time point in the to-be-processed image sets can form a 3D image, and a plurality of to-be-processed images corresponding to different time points may form a 3D image sequence. By using the image segmentation method in the embodiments of the present disclosure, the 3D image sequence may be identified and segmented to acquire a target region therein.

The following describes apparatus embodiments of the present disclosure, and the apparatus embodiments may be used for performing the medical image segmentation method in the foregoing embodiment of the present disclosure. For details not disclosed in the apparatus embodiments of the present disclosure, refer to the foregoing embodiment of the medical image segmentation method of the present disclosure.

Figure 12:
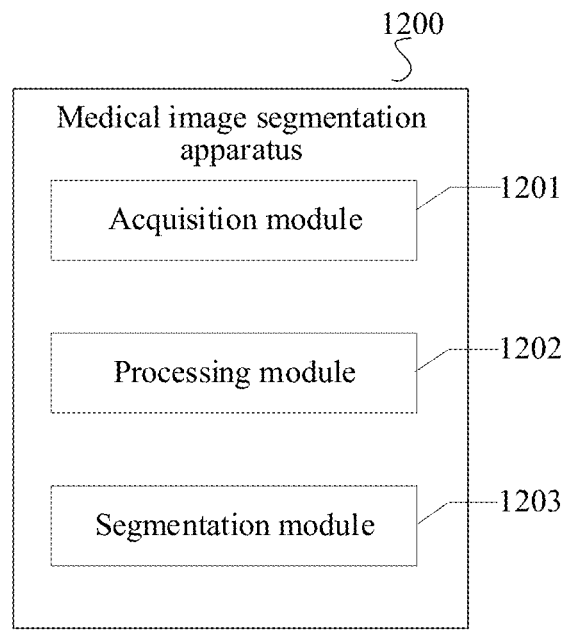
FIG. 12 is a schematic block diagram of a medical image segmentation apparatus according to one or more embodiments of the present disclosure.

FIG. 12 shows a schematic block diagram of a medical image segmentation apparatus according to the present disclosure.

Referring to FIG. 12, a medical image segmentation apparatus 1200 according to an embodiment of the present disclosure includes an acquisition module 1201, a processing module 1202, and a segmentation module 1203.

The acquisition module 1201 is configured to acquire a to-be-processed medical image set, the to-be-processed medical image set including a plurality of to-be-processed medical images corresponding to different time points. The processing module 1202 is configured to process the to-be-processed medical image set in a time dimension according to the to-be-processed medical images and the time points corresponding to the to-be-processed medical images to obtain a temporal dynamic image. The segmentation module 1203 is configured to extract a target region feature from the temporal dynamic image by using a medical image segmentation model, to acquire a target region.

In an embodiment of the present disclosure, when or in response to determining a plurality of the to-be-processed image sets are acquired, each of the to-be-processed medical image sets corresponds to a cross section, and the to-be-processed medical images corresponding to the same time point in the to-be-processed medical image sets form a 3D medical image. Based on the foregoing solutions, the medical image segmentation apparatus 1200 includes: a cross section determining module 1204, configured to determine a coordinate plane corresponding to the cross section and a cross section coordinate axis according to three dimensions of the 3D medical image, the cross section coordinate axis being perpendicular to the coordinate plane.

In an embodiment of the present disclosure, the processing module 1202 includes: a 4D data acquisition unit, configured to determine 4D data corresponding to the cross section according to to-be-processed medical image data corresponding to the cross section and the time point; a first time component acquisition unit, configured to analyze the 4D data corresponding to each of the cross sections to obtain a time component corresponding to each of the cross sections; a second time component acquisition unit, configured to determine a target time component corresponding to the plurality of the to-be-processed medical image sets according to the time component corresponding to each of the cross sections; and a post-processing unit, configured to perform post-processing on the target time component to obtain the temporal dynamic image.

In an embodiment of the present disclosure, based on the foregoing solutions, the 4D data acquisition unit includes: a spatial coordinate determining unit, configured to determine a first coordinate, a second coordinate, and a cross section coordinate according to the to-be-processed medical image data corresponding to the cross section, the first coordinate, the second coordinate, and the cross section coordinate being perpendicular to each other; a time coordinate determining unit, configured to determine a time coordinate according to the time point; and a 4D data determining unit, configured to construct 4D coordinate axes according to the first coordinate, the second coordinate, the cross section coordinate, and the time coordinate, and determine the 4D data according to the 4D coordinate axes.

In an embodiment of the present disclosure, the first time component acquisition unit includes: a first image data acquisition unit, configured to determine a target cross section according to the cross section coordinate, and acquire first image data corresponding to the target cross section, the first image data including the first coordinate, the second coordinate, and the time coordinate; and a multi-dimensional analyzing unit, configured to perform a multi-dimensional analysis on the first image data to acquire a time component corresponding to the target cross section; repeating the foregoing operations until the time component corresponding to the cross sections are acquired.

In an embodiment of the present disclosure, the second time component acquisition unit is configured to: determine the target time component according to the time component corresponding to each of the cross sections, and a first coordinate, a second coordinate, and a cross section coordinate that correspond to each of the cross sections.

In an embodiment of the present disclosure, based on the foregoing solutions, the multi-dimensional analyzing unit is configured to: perform the multi-dimensional analysis on the first image data by using 3D Clifford algebra, to acquire the time component corresponding to the target cross section.

In an embodiment of the present disclosure, the post-processing unit is configured to: determine a sub-time component corresponding to each of the cross sections at each of the time points according to the target time component, the quantity of the sub-time components being the same as the quantity of the time points; add and average the sub-time components corresponding to each of the cross sections to acquire a target average value; and construct the temporal dynamic image according to the target average values.

In an embodiment of the present disclosure, the post-processing unit is configured to: determine a sub-time component corresponding to each of the cross sections at each of the time points according to the target time component, the quantity of the sub-time components being the same as the quantity of the time points; and acquire a maximum value in the sub-time components corresponding to each of the cross sections; and construct the temporal dynamic image according to the maximum values in the sub-time components.

In an embodiment of the present disclosure, the post-processing unit is configured to: determine a sub-time component corresponding to each of the cross sections at each of the time points according to the target time component, the quantity of the sub-time components being the same as the quantity of the time points; and acquire a maximum value and a minimum value in the sub-time components corresponding to each of the cross sections, and subtracting the minimum value from the maximum value to acquire a target difference; and construct the temporal dynamic image according to the target differences.

In an embodiment of the present disclosure, the medical image segmentation apparatus 1200 further includes: a sample acquisition module 1205 and a training module 1206.

The sample acquisition module 1205 is configured to acquire a temporal dynamic image sample and a labeled target region sample corresponding to the temporal dynamic image sample; and the training module 1206 is configured to train a to-be-trained medical image segmentation model according to the temporal dynamic image sample and the labeled target region sample, to obtain the medical image segmentation model.

In some embodiments of the present disclosure, the 3D medical image is a 3D DCE-MRI image.

Figure 13:
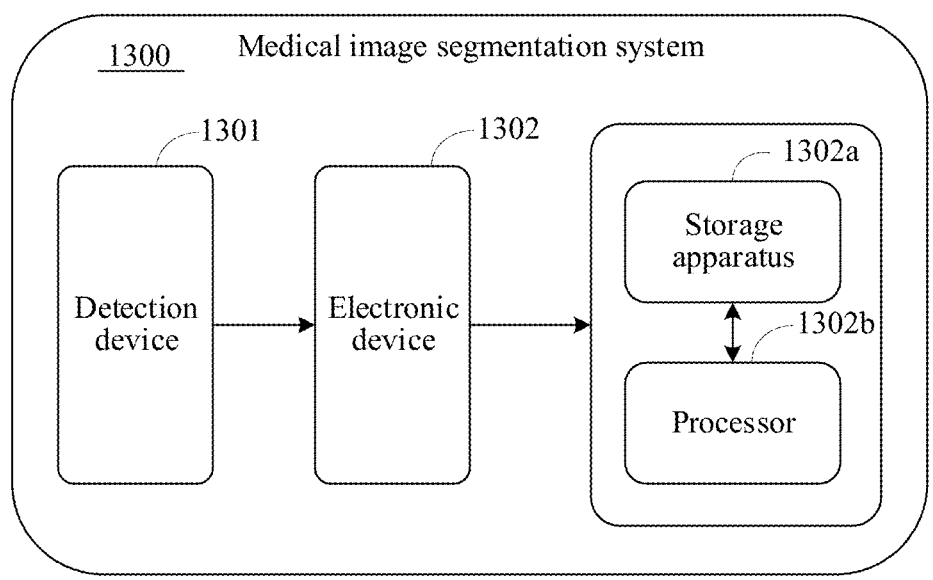
FIG. 13 is a schematic flowchart of a medical image segmentation system according to one or more embodiments of the present disclosure.

FIG. 13 shows a medical image segmentation system. As shown in FIG. 13, the medical image segmentation system 1300 includes a detection device 1301 and an electronic device 1302.

The detection device 1301 is configured to scan and detect a detection object to acquire a to-be-processed medical image set, the to-be-processed medical image set including a plurality of to-be-processed medical images corresponding to different time points; and the electronic device 1302 is connected to the detection device, and includes a storage apparatus and a processor, the storage apparatus being configured to store one or more programs, and the one or more programs, when executed by the processor, causing the processor to implement the foregoing medical image segmentation method.

In an embodiment of the present disclosure, the detection device 1301 may be a scanning apparatus for acquiring scanned images in a CT device, and the scanned apparatus includes a ray emitting source, a detector, and a scanning frame, may be a scanning apparatus for acquiring scanned images in a nuclear magnetic resonance imaging device, and the scanning apparatus includes a magnet part, a magnetic resonance spectroscopy part, and a scanning table, or may be a scanning apparatus for acquiring scanned images in a fluoroscopy device, and the scanning device includes a ray emitting source and a detector. In certain embodiments, the scanning apparatus may alternatively be another detection device, as long as the device may be used for scanning the detection object to acquire a scanned image. This is not limited in the present disclosure. After the detection device 1301 scans and obtains a plurality of to-be-processed medical image sets, the to-be-processed medical image sets may be transmitted to a storage apparatus 1302*a* and/or a processor 1302*b* in the electronic device 1302, and the storage apparatus 1302*a* further stores one or more programs for the processor 1302*b* to execute. The processor 1302*b* may execute one or more programs stored in the storage apparatus 1302*a* on the to-be-processed medical image set, that is, the processor 1302*b* can perform image segmentation on the to-be-processed medical image set according to the technical solutions in the embodiments of the present disclosure to acquire the target region. Further, the processor 1302*b* may alternatively transmit an image including the target region to a display device (not shown) connected to the electronic device 1302 for display, so that doctors may observe and determine a focus and make a regimen.

Figure 14:
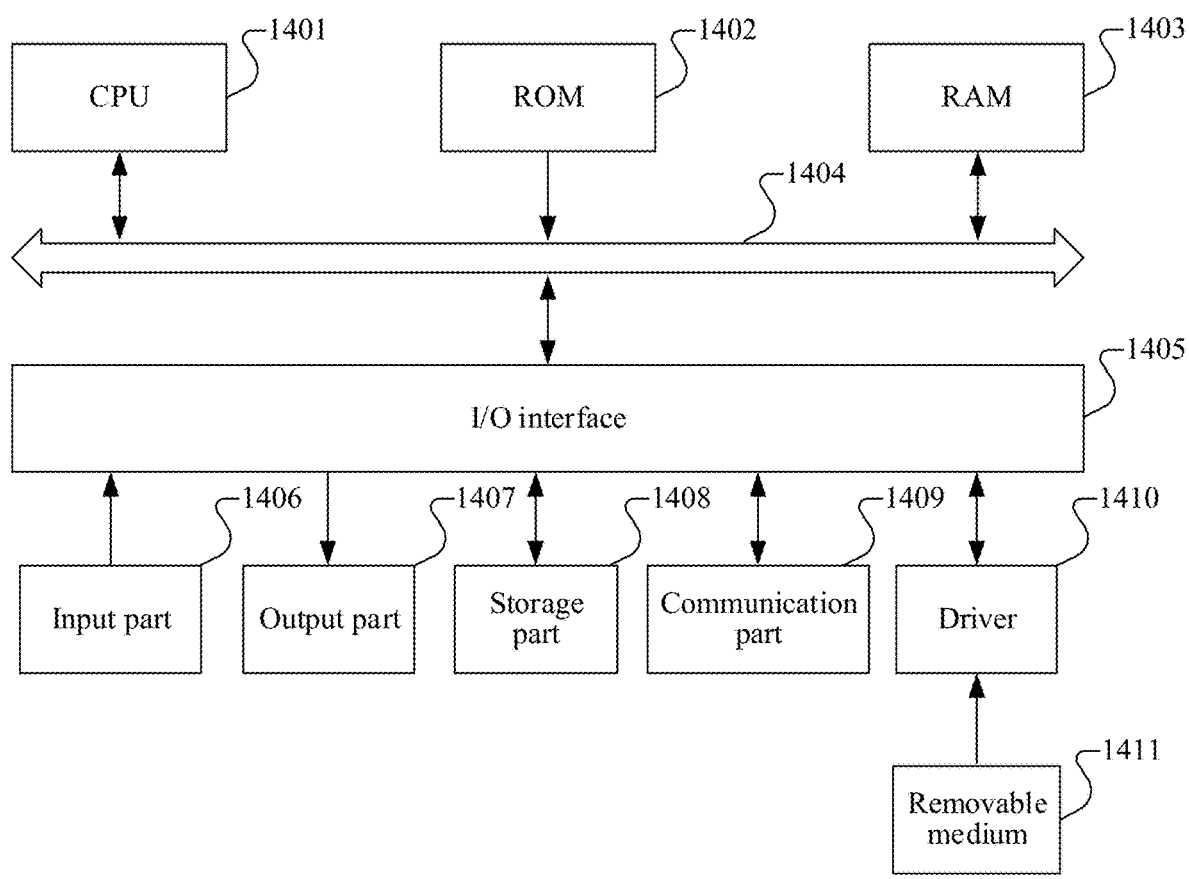
FIG. 14 is a schematic structural diagram of a computer system of an electronic device adapted to implement one or more embodiments of the present disclosure.

FIG. 14 is a schematic structural diagram of a computer system of an electronic device 1302 adapted to implement embodiments of the present disclosure.

The computer system 1400 of the electronic device shown in FIG. 14 is merely an example, and does not constitute any limitation on functions and use ranges of the embodiments of the present disclosure.

As shown in FIG. 14, the computer system 1400 includes a central processing unit (CPU) 1401, which may perform various proper actions and processing based on a program stored in a read-only memory (ROM) 1402 or a program loaded from a storage part 1408 into a random access memory (RAM) 1403. The RAM 1403 further stores various programs and data required for system operations. The CPU 1401, the ROM 1402, and the RAM 1403 are connected to each other through a bus 1404. An input/output (I/O) interface 1405 is also connected to the bus 1404.

The following components are connected to the I/O interface 1405: an input part 1406 including a keyboard, a mouse, or the like, an output part 1407 including a cathode ray tube (CRT), a liquid crystal display (LCD), a speaker, or the like, a storage part 1408 including a hard disk, or the like, and a communication part 1409 including a network interface card such as a local area network (LAN) card or a modem. The communication part 1409 performs communication processing through a network such as the Internet. A driver 1410 is also connected to the I/O interface 1405 as required. A removable medium 1411 such as a magnetic disk, an optical disc, a magneto-optical disk, or a semiconductor memory is installed on the drive 1410 as required, so that a computer program read from the removable medium 1411 is installed into the storage part 1408 as required.

Particularly, according to an embodiment of the present disclosure, the processes described in the following by referring to the flowcharts may be implemented as computer software programs. For example, this embodiment of the present disclosure includes a computer program product, the computer program product includes a computer program carried on a computer-readable medium, and the computer program includes program code used for performing the methods shown in the flowcharts. In such an embodiment, the computer program may be downloaded and installed through the communication part 1409 from a network, and/or installed from the removable medium 1411. When the computer program is executed by the central processing unit (CPU) 1401, the various functions defined in the system of the present disclosure are executed.

The computer-readable medium shown in the embodiments of the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

A related unit described in the embodiments of the present disclosure may be implemented in a software manner, or may be implemented in a hardware manner, and the unit described can also be set in a processor. Names of these units do not constitute a limitation on the units in a case.

According to another aspect, the present disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Although a plurality of modules or units of a device configured to perform actions are discussed in the foregoing detailed description, such division is not mandatory. Actually, according to the implementations of the present disclosure, the features and functions of two or more modules or units described above may be implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with suitable hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

In view of the present disclosure, a person skilled in the art may easily conceive of other implementations of the present disclosure. The present disclosure is intended to cover any variations, uses or adaptation of the present disclosure following the general principles of the present disclosure, and may include the well-known knowledge and conventional technical means in the art and undisclosed in the present disclosure.

The present disclosure is not limited to the accurate structures that are described above and that are shown in the accompanying drawings, and modifications and changes may be made without departing from the scope of the present disclosure. The scope of the present disclosure is reflected by the appended claims.

What is claimed is:

1. A medical image segmentation method, applicable to an electronic device, the method comprising:
    acquiring a to-be-processed medical image set, the to-be-processed medical image set including a plurality of to-be-processed medical images corresponding to different time points;
    processing the to-be-processed medical image set in a time dimension according to the to-be-processed medical images and the time points corresponding to the to-be-processed medical images to obtain a temporal dynamic image; and
    extracting a target region feature from the temporal dynamic image by using a medical image segmentation model, to acquire a target region.

2. The medical image segmentation method according to claim 1, wherein, in response to determining a plurality of the to-be-processed medical image sets are acquired, each of the to-be-processed medical image sets corresponds to a cross section, and the to-be-processed medical images corresponding to the same time point in the to-be-processed medical image sets form a three-dimensional (3D) medical image; and
    before the processing the to-be-processed medical image set in the time dimension according to the to-beprocessed medical images and the time points corresponding to the to-be-processed medical images to obtain the temporal dynamic image, the method further comprises:
determining a coordinate plane corresponding to the cross section and a cross section coordinate axis according to three dimensions of the 3D medical image, the cross section coordinate axis being perpendicular to the coordinate plane.

3. The medical image segmentation method according to claim 2, wherein the processing the to-be-processed medical image set in a time dimension according to the to-be-processed medical images and the time points corresponding to the to-be-processed medical images to obtain a temporal dynamic image comprises:
determining four-dimensional (4D) data corresponding to the cross section according to to-be-processed medical image data corresponding to the cross section and the time point;
analyzing the 4D data corresponding to each of the cross sections to obtain a time component corresponding to each of the cross sections;
determining a target time component corresponding to the plurality of the to-be-processed medical image sets according to the time component corresponding to each of the cross sections; and
performing post-processing on the target time component to obtain the temporal dynamic image.

4. The medical image segmentation method according to claim 3, wherein the determining four-dimensional (4D) data corresponding to the cross section according to to-be-processed medical image data corresponding to the cross section and the time point comprises:
determining a first coordinate, a second coordinate, and a cross section coordinate according to the to-be-processed medical image data corresponding to the cross section, the first coordinate, the second coordinate, and the cross section coordinate being perpendicular to each other;
determining a time coordinate according to the time point; and
constructing 4D coordinate axes according to the first coordinate, the second coordinate, the cross section coordinate, and the time coordinate, and determining the 4D data according to the 4D coordinate axes.

5. The medical image segmentation method according to claim 3, wherein the analyzing the 4D data corresponding to each of the cross sections to obtain the time component corresponding to each of the cross sections comprises:
determining a target cross section according to the cross section coordinate, and acquiring first image data corresponding to the target cross section, the first image data comprising the first coordinate, the second coordinate, and the time coordinate;
performing a multi-dimensional analysis on the first image data to acquire a time component corresponding to the target cross section; and
repeating the foregoing operations until the time components corresponding to the cross sections are acquired.

6. The medical image segmentation method according to claim 3, wherein the determining a target time component corresponding to the plurality of the to-be-processed medical image sets according to the time component corresponding to each of the cross sections comprises:
determining the target time component according to the time component corresponding to each of the cross sections, and a first coordinate, a second coordinate, and a cross section coordinate that correspond to each of the cross sections.

7. The medical image segmentation method according to claim 5, wherein the performing a multi-dimensional analysis on the first image data to acquire the time component corresponding to the target cross section comprises:
performing the multi-dimensional analysis on the first image data by using 3D Clifford algebra to acquire the time component corresponding to the target cross section.

8. The medical image segmentation method according to claim 3, wherein the performing post-processing on the target time component to obtain the temporal dynamic image comprises:
determining a sub-time component corresponding to each of the cross sections at each of the time points according to the target time component, the quantity of the sub-time components being the same as the quantity of the time points;
adding and averaging the sub-time components corresponding to each of the cross sections to acquire a target average value; and
constructing the temporal dynamic image according to the target average values.

9. The medical image segmentation method according to claim 3, wherein the performing post-processing on the target time component to obtain the temporal dynamic image comprises:
determining a sub-time component corresponding to each of the cross sections at each of the time points according to the target time component, the quantity of the sub-time components being the same as the quantity of the time points;
acquiring a maximum value in the sub-time components corresponding to each of the cross sections; and
constructing the temporal dynamic image according to the maximum values in the sub-time components.

10. The medical image segmentation method according to claim 3, wherein the performing post-processing on the target time component to obtain the temporal dynamic image comprises:
determining a sub-time component corresponding to each of the cross sections at each of the time points according to the target time component, the quantity of the sub-time components being the same as the quantity of the time points;
acquiring a maximum value and a minimum value in the sub-time components corresponding to each of the cross sections, and subtracting the minimum value from the maximum value to obtain a target difference; and
constructing the temporal dynamic image according to the target differences.

11. The medical image segmentation method according to claim 1, wherein before the extracting a target region feature from the temporal dynamic image by using the medical image segmentation model, to acquire the target region, the method further comprises:
acquiring a temporal dynamic image sample and a labeled target region sample corresponding to the temporal dynamic image sample; and
training a to-be-trained medical image segmentation model according to the temporal dynamic image sample and the labeled target region sample, to obtain the medical image segmentation model.

12. A medical image segmentation system comprising: a medical image segmentation apparatus, wherein the medical image segmentation includes a memory storing computer program instructions, and a processor coupled to the memory and configured to execute the computer program instructions and perform:

acquiring a to-be-processed medical image set, the to-be-processed medical image set comprising a plurality of to-be-processed medical images corresponding to different time points;

processing the to-be-processed medical image set in a time dimension according to the to-be-processed medical images and the time points corresponding to the to-be-processed medical images to obtain a temporal dynamic image; and extracting a target region feature from the temporal dynamic image by using a medical image segmentation model, to acquire a target region.

13. The medical image segmentation system according to claim 12, wherein, in response to determining a plurality of the to-be-processed medical image sets are acquired, each of the to-be-processed medical image sets corresponds to a cross section, and the to-be-processed medical images corresponding to the same time point in the to-be-processed medical image sets form a three-dimensional (3D) medical image; and before the processing the to-be-processed medical image set in the time dimension according to the to-be-processed medical images and the time points corresponding to the to-be-processed medical images to obtain the temporal dynamic image, the processor is further configured to perform:

determining a coordinate plane corresponding to the cross section and a cross section coordinate axis according to three dimensions of the 3D medical image, the cross section coordinate axis being perpendicular to the coordinate plane.

14. The medical image segmentation system according to claim 13, wherein the processing the to-be-processed medical image set in a time dimension according to the to-be-processed medical images and the time points corresponding to the to-be-processed medical images to obtain a temporal dynamic image comprises:

determining four-dimensional (4D) data corresponding to the cross section according to to-be-processed medical image data corresponding to the cross section and the time point;

analyzing the 4D data corresponding to each of the cross sections to obtain a time component corresponding to each of the cross sections;

determining a target time component corresponding to the plurality of the to-be-processed medical image sets according to the time component corresponding to each of the cross sections; and performing post-processing on the target time component to obtain the temporal dynamic image.

15. The medical image segmentation system according to claim 14, wherein the determining four-dimensional (4D) data corresponding to the cross section according to to-be-processed medical image data corresponding to the cross section and the time point comprises:

determining a first coordinate, a second coordinate, and a cross section coordinate according to the to-be-processed medical image data corresponding to the cross section, the first coordinate, the second coordinate, and the cross section coordinate being perpendicular to each other;

determining a time coordinate according to the time point; and constructing 4D coordinate axes according to the first coordinate, the second coordinate, the cross section coordinate, and the time coordinate, and determining the 4D data according to the 4D coordinate axes.

16. The medical image segmentation method according to claim 14, wherein the analyzing the 4D data corresponding to each of the cross sections to obtain the time component corresponding to each of the cross sections comprises:

determining a target cross section according to the cross section coordinate, and acquiring first image data corresponding to the target cross section, the first image data comprising the first coordinate, the second coordinate, and the time coordinate;

performing a multi-dimensional analysis on the first image data to acquire a time component corresponding to the target cross section; and repeating the foregoing operations until the time components corresponding to the cross sections are acquired.

17. The medical image segmentation system according to claim 15, wherein the determining a target time component corresponding to the plurality of the to-be-processed medical image sets according to the time component corresponding to each of the cross sections comprises:

determining the target time component according to the time component corresponding to each of the cross sections, and a first coordinate, a second coordinate, and a cross section coordinate that correspond to each of the cross sections.

18. The medical image segmentation system according to claim 13, further comprising:

a detection device, coupled to the medical image segmentation apparatus and configured to scan and detect a detection object to acquire the to-be-processed medical image set.

19. A non-transitory computer-readable storage medium storing computer program instructions executable by at least one processor to perform:

acquiring a to-be-processed medical image set, the to-be-processed medical image set including a plurality of to-be-processed medical images corresponding to different time points;

processing the to-be-processed medical image set in a time dimension according to the to-be-processed medical images and the time points corresponding to the to-be-processed medical images to obtain a temporal dynamic image; and extracting a target region feature from the temporal dynamic image by using a medical image segmentation model, to acquire a target region.

20. The non-transitory computer-readable storage medium according to claim 19, wherein, in response to determining a plurality of the to-be-processed medical image sets are acquired, each of the to-be-processed medical image sets corresponds to a cross section, and the to-be-processed medical images corresponding to the same time point in the to-be-processed medical image sets form a three-dimensional (3D) medical image; and before the processing the to-be-processed medical image set in the time dimension according to the to-be-processed medical images and the time points corresponding to the to-be-processed medical images to obtain the temporal dynamic image, the computer program instructions are executable by the at least one processor to further perform:

determining a coordinate plane corresponding to the cross section and a cross section coordinate axis according to three dimensions of the 3D medical image, the cross section coordinate axis being perpendicular to the coordinate plane.

* * * * *